Feb. 13, 1923.
G. REISINGER
1,445,448
HOLLOW MILLING TOOL
Filed Nov. 23, 1921
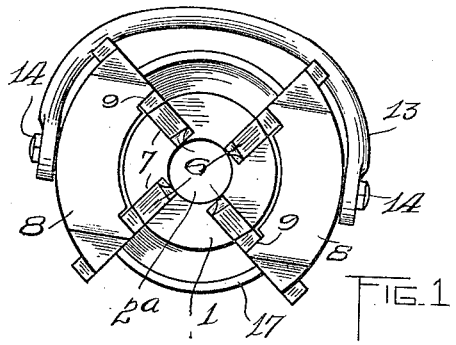
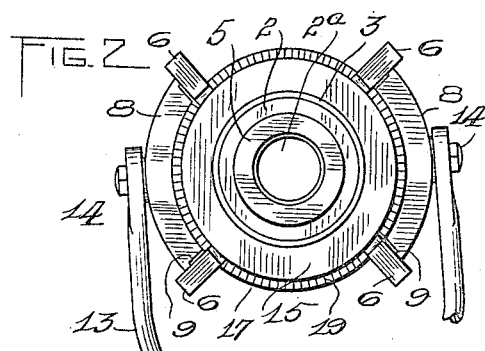
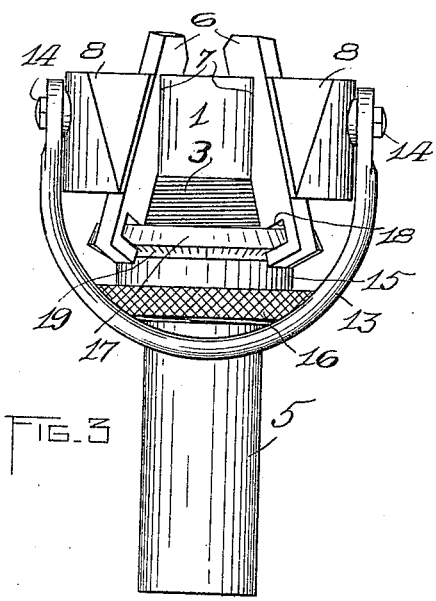
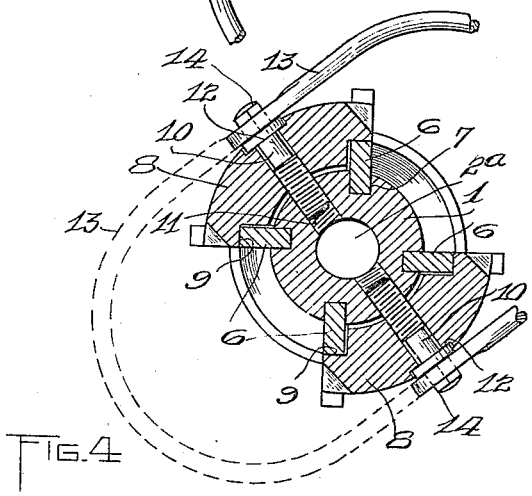
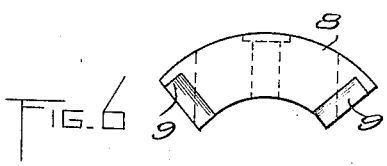
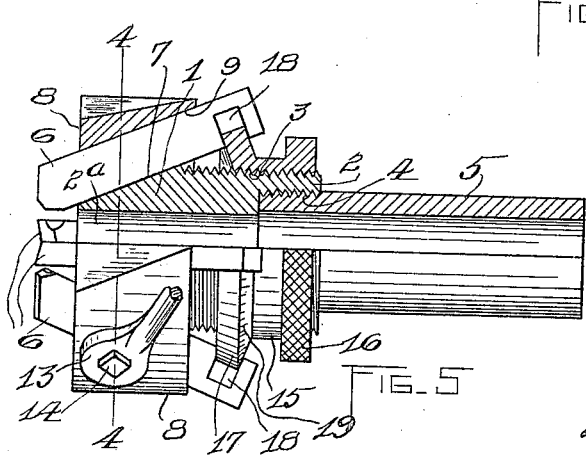
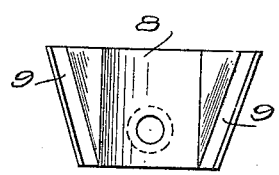
INVENTOR.
George Reisinger
BY
Davis & Simms
ATTORNEYS Patented Feb. 13, 1923.

1,445,448

UNITED STATES PATENT OFFICE.

GEORGE REISINGER, OF ROCHESTER, NEW YORK.

HOLLOW MILLING TOOL.

Application filed November 23, 1921. Serial No. 517,207.

*To all whom it may concern:*

Be it known that I, GEORGE REISINGER, a citizen of the United States, and resident of Rochester, in the county of Monroe and State of New York, have invented certain new and useful Improvements in a Hollow Milling Tool, of which the following is a specification.

The present invention relates to a hollow milling tool of the type employing a head on which are disposed a plurality of tools adjustable on lines converging toward one side of the tool, an object of this invention being to provide a construction in which the tools may be retracted, as well as, advanced through a single controlling means. Another object of the invention is to provide a readily adjustable means for clamping the tools or cutters on the head so that equal pressure may be secured upon the cutters. A still further object of the invention is to provide a plurality of clamping devices, each of which cooperates with a plurality of cutters to produce equal pressure thereon. Another object of the invention is to provide a plurality of clamping devices for the different cutters controllable through a single controlling member.

To these and other ends, the invention consists of certain parts and combinations of parts, all of which will be hereinafter described, the novel features pointed out in the appended claims.

In the drawings:

Fig. 1 is a view of one end of the tool;

Fig. 2 is a view of the opposite end;

Fig. 3 is a side view of the tool;

Fig. 4 is a section on the line 4—4, Fig. 5;

Fig. 5 is a view of the tool, showing one-half in section and the other half in side elevation;

Fig. 6 is a view of one of the clamping devices; and

Fig. 7 is another view of a clamping device.

In the illustrated embodiment of the invention there is provided a head 1 formed with a central opening 2ª and an extension 2 internally threaded at 4. The internally threaded portion receives the screw threaded end of a hollow shank 5, thereby providing a detachable connection between the shank and the head so that the shank may be removed and shanks of other diameters employed.

The head 1 may have suitable guiding means thereon for the cutting tools or cutters 6, this guiding means being preferably in the form of grooves 7 in a periphery of the head converging to a point beyond one end of said head so that the cutters when adjusted upon the head move in converging lines toward the axis of the tool.

For securing the cutters in their adjusted positions on the head, any suitable clamping means may be employed. In this instance, two clamping devices 8 are provided, each of which has abutments 9 at opposite ends for engaging with two of the tools 6. Furthermore, each clamping device may be held by a securing device 10 formed with a screw threaded portion having engagement at 11 with the head 1. This fastening device extends loosely through the clamping member 8 and has a shoulder 12 for cooperation with said clamping member. The two fastening devices are oppositely threaded so that they may be simultaneously operated through a common controlling member 13 to release or clamp all of the cutters simultaneously. In this instance, the common controlling member is a U shaped piece or yoke having its ends perforated and receiving non-circular portions 14 on the fastening devices 10. The arms of the U shaped member may be sprung apart to disconnect the member from the fastening devices when desirable. It is apparent that the rotation of the yoke 13 in one direction will effect the simultaneous operation of both screws to clamp both of the clamping devices 8, while the operation of the yoke or controlling means in the other direction will effect the simultaneous operation of both screws to loosen the cutters 6. This construction of clamping means makes it possible to secure equal pressure on all of the cutters or blades without the provision of a separate clamping device for each cutter. Furthermore, this construction makes it possible to adjust a plurality of clamping devices from a common means or controlling member thus reducing the labor of fastening and releasing the cutters.

Another feature of this invention is the means by which the cutters are advanced or retracted. This means, in this instance, embodies a ring or collar 15 mounted to turn on a screw threaded portion 3 of the extension 2 on the head so as to move axially of said head. This ring or collar 15 has a knurled portion 16 by which it is operated and an annular rib 17 which projects into notches 18 of the cutters, so as to cooperate with opposite walls of said notches. It is apparent that when the ring is moved in one direction, the cutters will be advanced, and when moved in the other direction, the cutters will be retracted. This ring 15 may also be provided with graduations 19 which will make it possible to determine the amount of advancement or retraction of the cutters.

In the use of the invention, the cutters are positioned on the head 1 in the guideways 7. The clamps are then secured in position by the fasteners 10, so that the adjustment between the fasteners is such that a like adjustment in the two fasteners produces a like clamping in the two clamping devices 8. The yoke 13 is then fitted to the fasteners, so that when it is swung to the position shown in Fig. 3, the desired clamping action is secured and when shifted to the dotted line position shown in Fig. 4, the clamps will free the cutters 6, so that the latter may be adjusted through the adjusting ring or collar 15.

From the foregoing it will be seen that there has been provided a hollow milling tool in which the shank is removable from the head, so that shanks of other diameters may be employed. The cutters are held by clamping means which will permit an equal clamping action in all of the cutters. Each clamping device clamps a pair of cutters and is held by a single screw. The screws for the two clamping devices are controlled by a common controlling member, thus effecting the release and the clamping of the cutters. The cutters are not only advanced by a collar adjustable on the head but this collar serves also for retracting such cutters.

What I claim as my invention and desire to secure by Letters Patent is:—

1. A hollow milling tool comprising a head, provided with a plurality of guides converging toward one end of the head, cutters mounted in said guides, and means cooperating with the cutters in rear of the guides for operating said cutters simultaneously in either direction in said guides.

2. A hollow milling tool comprising a head, provided with guides converging toward one end of the head, cutters adjustable in said guides, and a member adjustable axially of the head in rear of the guides and having a connection with all of the cutters to effect the simultaneous movement of the cutters in the guides in either direction.

3. A hollow milling tool comprising a head having converging guides thereon, cutters movable in said guides, and a collar having screw threaded engagement with the head in rear of the guides to move axially of the latter, said collar having connection with all of the cutters to move the latter in either direction in the guides.

4. A hollow milling tool comprising a head having converging guides thereon, cutters operable in the guides and provided with notches in their faces opposed to the guides, a collar having screw threaded engagement with the head to move axially thereof, said collar having an annular flange operating in the notches of the cutters and means independent of the collar for clamping said cutters to the head.

5. A hollow milling tool comprising a head, grooved guides on the head, cutters operating in the grooved guides, and a plurality of clamping devices for the cutters, each of said clamping devices holding and confining at least two of the cutters in the grooves.

6. A hollow milling tool comprising a grooved head, cutters guided in the grooves of the head, a plurality of clamping devices for the cutters, each of said clamping devices holding and confining two of the cutters in their grooves, and a separate fastening device for each clamping device.

7. A hollow milling tool comprising a grooved head, cutters adjustable in the grooves of the head, a plurality of clamping devices for the cutters, each clamping device holding and confining two of the cutters in their grooves, and a separate fastening screw passing loosely through each clamping device and engaging the head.

8. A hollow milling tool comprising a head, cutters adjustable on the head, a plurality of clamping devices for holding the cutters to the head, and a common means for controlling said clamping devices.

9. A hollow milling tool comprising a head, cutters adjustable on the head, a plurality of clamping devices for securing the cutters on the head, a separate fastening screw for each clamping device, and a common operating means for the screws.

10. A hollow milling tool comprising a head, cutters adjustable on the head, two clamping devices for holding the cutters on the head, two screws for securing the clamping devices, one of said screws being a right hand screw and the other being a left hand screw, and a yoke connected to both the screws.

11. A hollow milling tool comprising a head, grooved guides in the head, cutters operating in said grooved guides and provided with notches in their faces opposed to the guides, a collar having screw threaded engagement with the head in rear of the guides and extending into said sockets, and a plurality of clamping devices for holding said cutters in the grooves.

GEORGE REISINGER.